R. E. RUSSELL.
FUEL MIXTURE CONTROLLER.
APPLICATION FILED SEPT. 20, 1919.
1,391,144.
Patented Sept. 20, 1921.
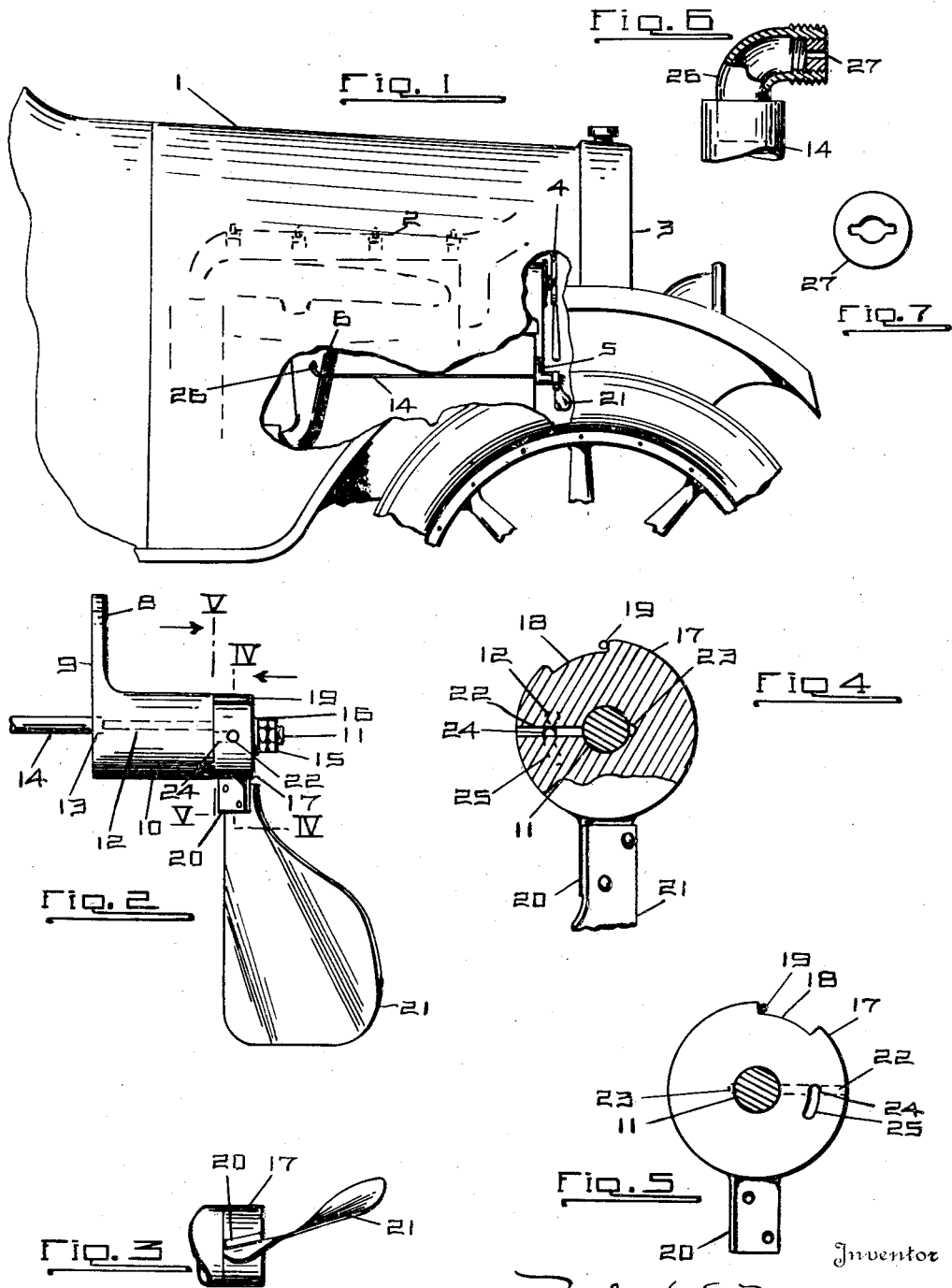
Inventor
Richard E. Russell
By
Geo E Kirk
Attorney

UNITED STATES PATENT OFFICE.

RICHARD E. RUSSELL, OF PERRYSBURG, OHIO.

FUEL-MIXTURE CONTROLLER.

1,391,144.  Specification of Letters Patent.  Patented Sept. 20, 1921.

Application filed September 20, 1919. Serial No. 325,266.

*To all whom it may concern:*

Be it known that I, RICHARD E. RUSSELL, a citizen of the United States of America, residing at Perrysburg, Wood county, Ohio, have invented new and useful Fuel-Mixture Controllers, of which the following is a specification.

This invention relates to fuel mixture affecting mechanism for internal combustion motor actuated vehicles.

This invention has utility when incorporated for modifying the mixture or air supply in an intake manifold of an internal combustion motor.

Referring to the drawings:

Figure 1 is a fragmentary view of a motor vehicle having the invention incorporated therewith;

Fig. 2 is a detail in side elevation of the device of the invention in Fig. 1;

Fig. 3 is a bottom plan view of a portion of the device of Fig. 2;

Fig. 4 is a section on the line IV—IV, Fig. 2, looking in the direction of the arrow; and Fig. 5 is a section on the line V—V, Fig. 2, looking in the direction of the arrow; Fig. 6 is a detail of the air delivery to the manifold; and Fig. 7 is a front elevation of the nozzle at the manifold.

A motor vehicle 1 is shown as provided with an internal combustion motor 2 for operating the vehicle. The instance taken herein of the current model T-type of Ford Motor Co. is a touring car which has a radiator 3 and just back of such radiator 3 a fan 4 and below on the side of the fan, looking from the rear is a bolt 5 through the oil-filler pipe opening. This bolt 5 passes through the spring that holds the timer in position. There is also provided the common Holly manifold intake 6 for supply of fuel.

In accordance with one embodiment of the invention herein, there is provided an opening 8 in bracket 9 to be mounted by bolt 5 in position to suspend cylindrical forwardly extending portion 10 from the hanger portion 9 of this bracket. This cylindrical portion 10 is shown as having a central rod or bar 11 therein, and laterally therefrom and a little upward a duct section 12. This duct section 12 in the portion 10 terminates rearwardly in an enlarged portion 13 into which may be sweat a copper tube 14 to extend to the fuel intake manifold 6.

The bearing stem 11 extending forwardly of the main bracket 9, 10, has nuts 15 thereon to engage washer 16 for holding member 17 in readily rotatable position on this bearing 11 adjacent the bracket portion 10. In the upper portion, this member 17 has a recess 18 in which may extend a pin 19 carried by the bracket 10, as means for limiting the movement or oscillation of this section or member 17. Downwardly from the rest position of this member 17 is a lug 20 for mounting a vane 21 as a draft actuable means and further as a gravity holding means for normally positioning the member 17 in normal position of rest.

Radially and horizontally extending as herein shown, the member 17 has a duct 22. This duct 22 with its terminal pocket 23 may, in practice, serve as a lubricant supply or oil feed hole for the bearing 11 on which the member 17 is mounted, notwithstanding the horizontal position of this duct portion 22. From this duct 22 and extending rearwardly is shown a duct section 24 which, with the member 17 at rest and downwardly held by the vane 21, is out of registry with the duct section 12 of the bracket 10. From this out of registry position of the duct 24 of the member 17 as shown herein, there may, in practice, be a movement of some $7\frac{1}{2}°$ as sufficient to bring about the register for air flow in diluting the fuel of the intake manifold 6. This shifting does not occur the moment the motor 2 is started. It will not occur until the car or vehicle 1 is under way at a sufficient speed to cause the inclined vane 21 to be shifted by the draft or flow of air. Accordingly, this vane 21 is disposed in a region where its operation is not modified by the action of the fan 4 as slightly below and to the right.

The movement of the member 17 as permitted by the recess portion 18 is greater than that of directly bringing the duct section 24 into registry with the duct section 12. However, this further movement may not interfere with the proper position of the device, for cut-out portion 25 in the base of the member 17 is provided on the portion of the member 17 away from the duct 12 when the device is at rest so that there may be a movement in initial opening to actual registering position and still a maintenance of the maximum flow of registering position in movement therebeyond.

In practice, when the motor is started and even the fan 4 speeded up, there is no fuel dilution by intake of air through the duct 14. As the car is brought under speed and at a sufficient rate to shift the vane 21, such shifting will gradually open the duct 12 so that the normal operation of intake suction of the motor by way of the intake fuel manifold 6 may effect drawing in of air without modifying the action of air in shifting the vane 21. This fuel dilution, as the motor gets under speed is a matter of considerable economy, meaning in ordinary Ford motor operation a matter of some three or four, if not five miles for a gallon of fuel on an undisturbed adjustment. The device is entirely automatic in its operation and requires no attention. In fact, its position adjacent the normal supply of oil to the crank shaft results in splashes from the supplying of oil accidentally occurring giving sufficient lubrication to the bearing 11. The curve or weave of the vane 21 may be nicely worked out as may be desired for delicacy of operation. In the valve device as herein shown, the intake operation is slightly audible, affording a signal to the driver of the operation of the fuel dilution device.

The air through the line 14 into the manifold 6 is most efficient when uniformly sprayed thereinto. To this end the line 14 terminates in an elbow 26 having a nozzle 27. This nozzle 27 has its discharge opening into the manifold 6 as small or smaller than the cross section of the duct 14 thereby contributing to a steady flow of air into the fuel of the manifold for uniform dilution.

What is claimed and it is desired to secure by Letters Patent is:

1. An internal combustion motor, a fuel supply intake therefor, a vehicle actuable by the motor, and mechanism affected by the speed of the vehicle coacting to modify fuel supply to the intake independently of the speed of the motor.

2. An internal combustion motor, a fuel supply intake therefor, a vehicle actuable by the motor, a supplemental air supply, and mechanism connected independently of the speed of the motor with the vehicle at rest and affected by the speed of the vehicle coacting to control the supplemental air supply.

3. An internal combustion motor having a fan creating a draft, fuel supply modifying mechanism including a duct and exterior of the duct draft actuable means independently of the fan draft for controlling the duct.

4. An internal combustion motor having a fan creating a draft, fuel supply modifying mechanism including a duct, and exterior of the duct a draft actuable vane independently of the fan draft for controlling the duct.

5. An internal combustion motor, fuel supply modifying mechanism including a duct, and a depending constant effective draft area vane gravity actuated for normally closing the duct.

6. An internal combustion motor, fuel supply modifying mechanism including a sectional duct, there being gravity means for closing the duct, and a draft actuable vane having a constant effective draft area inclined in opposition to draft flow for shifting the duct section against gravity into registering with another duct section, said duct having its intake opening directed to preclude draft flow directly thereinto.

7. An internal combustion motor, fuel supply modifying mechanism including a sectional duct, there being gravity means for closing the duct, a draft actuable vane having a constant effective draft area inclined in opposition to draft flow for shifting the duct section against gravity into registering with another duct section, and travel limiting means for the shiftable section, said duct having its intake opening directed to preclude draft flow directly thereinto.

8. A fuel controller accessory for internal combustion motors comprising a bracket providing a bearing and a duct section, a duct from the bracket to a fuel intake for a motor, a valve duct section mounted on the bracket bearing and normally out of register with the bracket duct, and constant effective draft area capacity vane for moving the valve duct section into registering position as to the bracket duct section.

9. A fuel controller accessory for internal combustion motors comprising a bracket providing a bearing and a duct section, a duct from the bracket to a fuel intake for a motor, a valve duct section mounted on the bracket bearing and normally out of register with the bracket duct, means for moving the valve duct section into registering position as to the bracket duct section, and constant effective draft area capacity vane for limiting the movement of the valve duct section.

10. A fuel controller accessory for internal combustion motors comprising a bracket providing a bearing and a duct section, a duct from the bracket to a fuel intake for a motor, a valve duct section mounted on the bracket bearing and normally out of register with the bracket duct, constant effective draft area capacity vane for moving the valve duct section into registering position as to the bracket duct section, said valve duct section being extended adjacent registry with the bracket duct section on the side away from initial opening position to permit throwing of the valve duct section past initial opening position to maintain the unrestricted flow of the duct.

11. A fuel controller air diluting device for an internal combustion motor including an automatic valve having a constant draft area exposure vane, a duct from the valve to the fuel intake manifold and a nozzle for spraying the air from the duct into the manifold.

12. A fuel controller air diluting device for an internal combustion motor including a valve, and a constant effective draft area capacity vane for shifting said valve.

In witness whereof I affix my signature.

RICHARD E. RUSSELL.